United States Patent Office  3,199,898
Patented Aug. 10, 1965

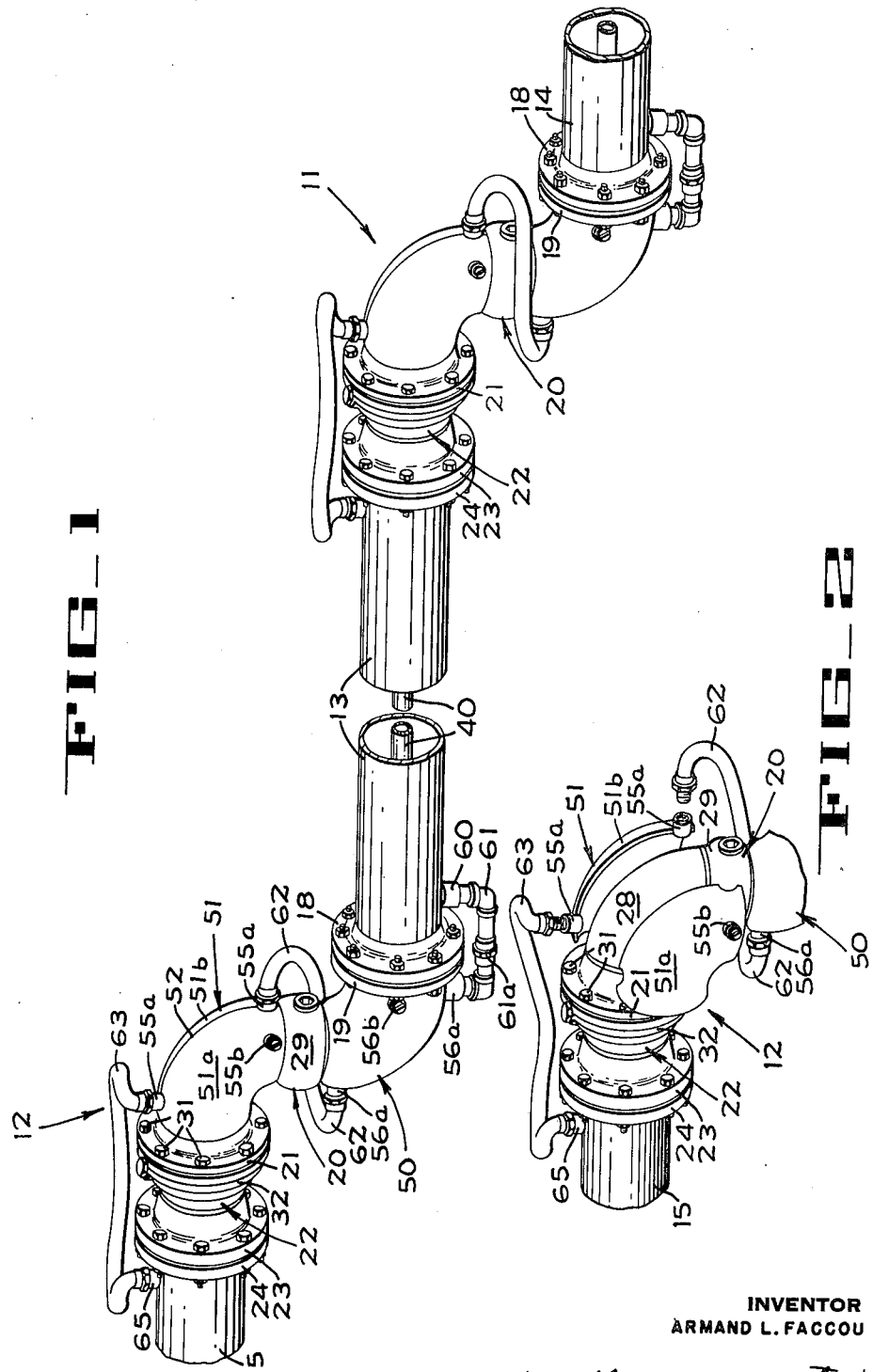

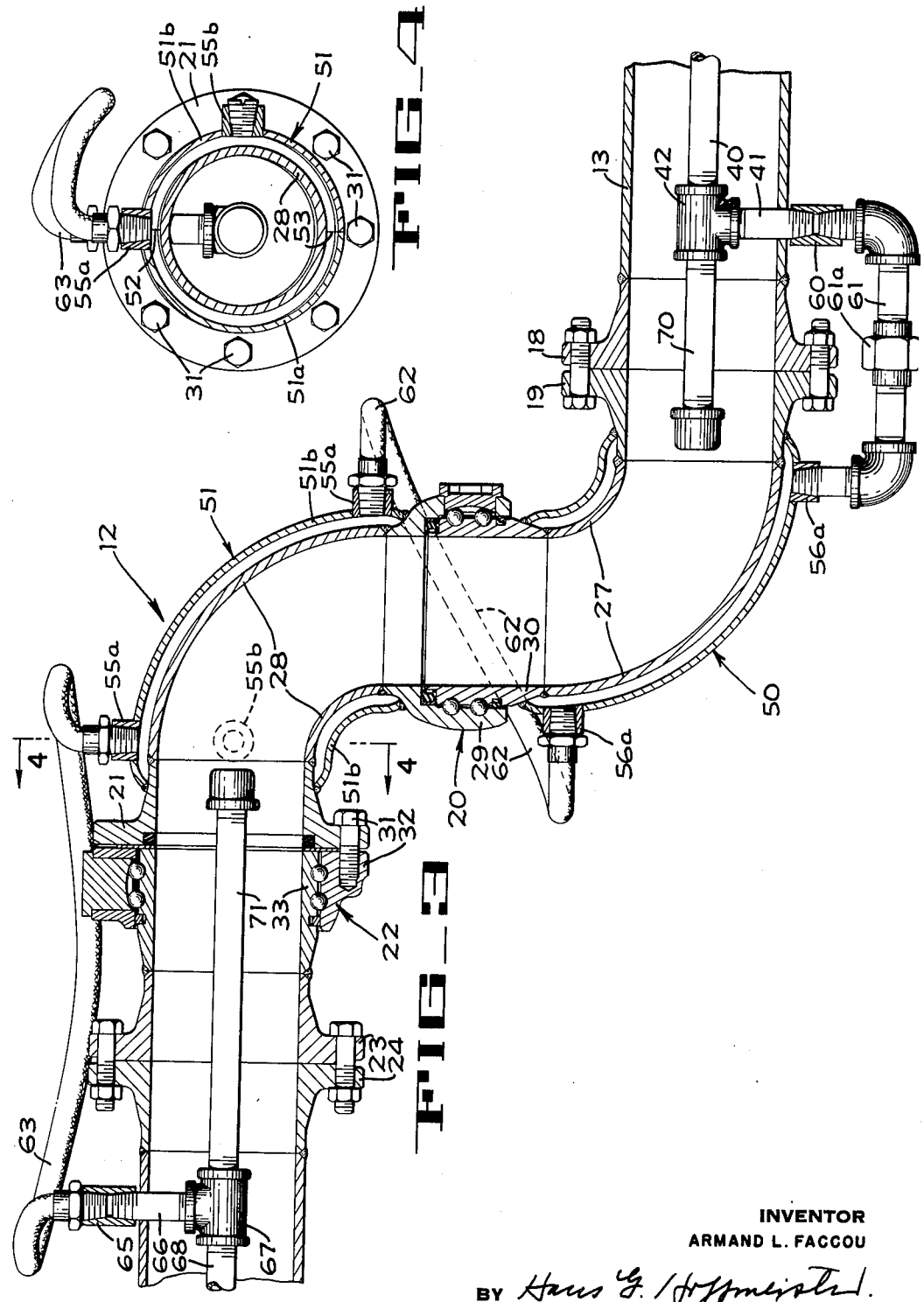

3,199,898
SWIVEL PIPE JOINT ASSEMBLY
Armand L. Faccou, Santa Ana, Calif., assignor to FMC Corporation, San Jose, Calif., a corporation of Delaware
Filed June 18, 1962, Ser. No. 203,054
2 Claims. (Cl. 285—41)

The present invention pertains to swivel pipe joint assemblies and more particularly to a method and means for heating such assemblies to provide for the conduction of certain materials which at normal temperatures do not possess sufficient fluidity for rapid flow.

Certain materials which have wide usage in commerce are of such a nature that they must be heated to temperatures above normal so that they will readily flow through conduit systems. For example, asphalt, heavy tars, and certain viscous oils are fluent enough for conduit transfer only at elevated temperatures. In this regard, the transfer of liquid sulphur presents a special problem since it is sufficiently fluent only within a narrow temperature range, while temperatures below that range cause crystallization and temperatures above said range cause extreme viscosity. For these reasons, materials such as liquid sulphur cannot be overheated to compensate for heat lost during flow through a cold piping system, and, therefore, they must be kept at a substantially constant temperature as nearly as is practicable. This requires generally that means be provided for heating the conduit used for conducting such materials.

One practice which has been widely followed in this regard is to provide a double-chamber type of conduit whereby steam, hot air or water can be passed through an outer annular chamber which encloses an inner conduit containing the flowing material. However, a problem has been present in the design of such heated conduits with regard to the transfer of the fluid through swivel assemblies. These assemblies comprise one or more elbowed swivel pipe joints which impart flexibility to the flow line. Such structures have many important commercial applications, as for example, in liquid cargo handling apparatus. The swivel joints comprising the swivel assemblies consist generally of a pair of relatively rotatable conduit sections, one received within the other, with one or both of the sections being in the form of an elbow. They are sold as a separate unit and are not, therefore, readily adaptable to the standard jacketing structure of the uniform conduit sections. Since quite often a swivel assembly may consist of several elbowed swivel joints connected together in series, it can be appreciated that means must be provided for heating such assemblies to prevent the rapid loss of heat through the joints thus permitting the heated fluids flowing therein to cool and become so viscous that serious flow stoppage problems are created.

Formerly, it was necessary to provide a complex, specially designed heated structure to accomplish the transfer of a heated fluid through a swivel assembly without appreciable heat loss. This was, of course, costly because of the special design of the assembly unit with its attendant problems due to the relative rotation between pipe sections at the swivel joints. When it was desired to convert an existing conduit system for the conduction of heated fluids, therefore, a wholly new, specially designed swivel assembly was needed which required dismantling of the system for its installation, a condition causing additional expense and delays in operation.

It is an object of the present invention to provide a method of converting a swivel pipe assembly to a heated assembly for the conduction of heated materials, retaining and utilizing standard unheated swivel joints and assemblies, such as those shown in United States Patent No. 2,746,773 to P. J. Bily, which method avoids the necessity of removing the swivel joints from the flow line during the converting process.

Another object is to provide a method for heating a standard swivel assembly in a rapid and efficient manner with a minimum of additional materials and expense.

Another object is to provide a heated swivel assembly which can be used for the conduction of heated materials through a conduit system without an appreciable loss of heat in any part of the system.

Another object is to provide a swivel joint which is capable of being uniformly heated from an external source to permit close temperature control of a material flowing therein.

These and other objects and advantages will become apparent from the following description and the accompanying drawings in which:

FIGURE 1 is a perspective of a part of a typical conduit system showing two swivel assemblies which utilize the heating apparatus of the present invention.

FIGURE 2 is a fragmentary exploded perspective of one of the swivel joints of FIGURE 1.

FIGURE 3 is an enlarged axial section through one of the swivel assemblies of FIGURE 1.

FIGURE 4 is a section taken on lines 4—4 of FIGURE 3.

Referring now more specifically to the drawings, FIGURE 1 illustrates two swivel assemblies 11 and 12, respectively, which may be used, by way of example, to form a jointed or flexible portions of a conduit structure such as a liquid cargo handling apparatus. The assemblies 11 and 12 are linked by a straight conduit section 13 and they are in turn connected to inflow conduit section 14 and discharge conduit section 15 which may be linked respectively with a transferring storage reservoir and the receiving storage reservoir at a typical loading facility. The purpose of the swivel assemblies, therefore, is to provide for substantially universal pivotal movement of both the inflow and discharge conduit sections, in accordance with common practice.

Each of the swivel assemblies 11 and 12 comprises two swivel joints whose axes are perpendicular to each other. As illustrated by FIGURE 1, each of the assemblies 11 and 12 includes a pair of flanged pipe connectors 18 and 19, a double elbowed swivel joint 20, a flanged pipe connector 21, a straight swivel joint 22, and a second pair of flanged pipe connectors 23 and 24, all of which are assembled in a connecting operative relationship between the straight flow sections of the conduit system. Each of these assemblies 11 and 12, which may be considered typical of such flexibility imparting structures, thus includes two independent swivel joints, one being of the double-elbow form while the other is of the straight variety. The conduit section 14 may be rotated about either the axis of the swivel joint 22 or the axis of the swivel joint 20 in the swivel assembly 11, thus making it rotatable in two perpendicularly related planes with respect to the conduit section 13. Similarly, the discharge conduit section 15 can be rotated in mutually perpendicular planes relatively to the intermediate conduit section 13. Thus a high degree of flexibility is imparted to the over-all system. In systems where even greater flexibility is desired, a correspondingly greater number of swivel joints may be employed.

FIGURE 3 shows in detail the construction of swivel assembly 12, one of the aforementioned swivel assemblies. The flanged pipe connectors 18 and 19 are welded to the conduit section 13 and to one of the elbows 27 of the swivel joint 20, respectively. The flanged portions of these connectors are placed in abutting relationship and tightly bolted together. The swivel joint 20, which is thus rigidly attached to the main conduit section 13 by the flanged pipe connectors, includes elbowed pipe sections 27 and 28 which are made relatively rotatable through the use of a standard swivel connection therebetween consisting of a housing member 29 and relatively rotatable inner member 30. A pair of machined raceways filled with ball bearing connectors is provided between the housing and inner members to permit relative rotation between the opposite ends of the joint. The flanged pipe connector 21 is welded to the elbowed pipe section 28 and is used to secure the straight swivel joint 22 to the elbowed swivel joint 20 by means of bolts 31 which extend through the flange on the connector 21 and are secured in the housing element 32 of the swivel joint 22. The inner member of the swivel joint 22 consists of a straight tubular section 33 which is rotatably connected to the housing 32 by means of the standard raceway and ball bearing connector system. In the manner of the previously described connections, the inner swivel joint member 33 is welded to the flanged pipe connector 23 which is in turn bolted to the connector 24 forming part of the discharge conduit section 15 and completing the two-way swivel assembly between the straight conduit sections 13 and 15.

The structure thus far described is typical of a broad class of swivel assemblies in common usage. For increased flexibility, additional elbowed pipe sections having swivel joint connecting members at their ends may be inserted into the assembly.

Thus, the assembly, in general, comprises a pair of straight connecting sections, 18–19 and 21–24, which are interconnected by a plurality of elbowed conduit sections joined together by relatively rotatable swivel joint members.

Such swivel assemblies have been found to be inadequate in certain cases in handling materials which are sufficiently fluid for conduit transfer only at elevated temperatures because of the excessive amount of heat lost as the materials are carried along an unheated piping system. This is particularly true when the assemblies contain several elbowed pipe sections and become quite lengthy. In order to prevent this loss of heat during transfer and to alleviate the serious flow stoppage problems arising therefrom, specially heated conduit sections have generally been utilized. These normally consist of a jacketed structure which carries steam or other heat supplying fluid and surrounds the material carrying conduit to prevent the external transfer of heat therefrom. However, problems have remained in the conduction of the heated material through a swivel assembly such as the assembly 12 shown in FIGURE 3. Since the path of travel from the main conduit section 13 to the discharge conduit 15 is rather long through the assembly 12, the amount of heat dissipated in this portion of the system might well be enough to cause flowing material within the conduit to become unduly viscous and seriously hamper its flow. Formerly, it was necessary to employ a specially designed swivel assembly provided with a prefabricated heating structure in order to overcome this disadvantage. In accordance with the present invention, any typical swivel assembly, such as assembly 12 shown in section in FIGURE 3, can be quickly and economically converted into a heated assembly for the conduction of fluid materials upon which it is desired to maintain strict temperature control.

The heating of the major portion of the conduit system, including the straight portions and any fixed elbow portions, is accomplished through the use of a small, specially heated pipe line which extends along the axis of the conduit, such as pipe 40 in the straight conduit section 13. This pipe is supported within the conduit 13 by means of threaded pipe nipples 41 (only one shown, FIG. 3) one of which extends through the conduit wall at each of its ends and is sealed thereto by welding. Each nipple 41 is threaded into a T fitting 42 which also threadedly receives the pipe line 40 so that it is fixed along the axis of the conduit. To provide the conduit section 13 with heat so as to maintain temperature control over the fluid flowing therein, steam or other heated fluid is passed through the pipe line 40. Under existing practices, flexible heated conduit systems have been utilized wherein all of the straight and fixed elbow sections are heated in the manner of conduit section 13 (or with a similar double flow passage system) while the swivel assemblies have remained unheated. As previously mentioned, this condition has brought about serious heat loss through the swivel assemblies particularly where the assembly is lengthy and comprises several intercommunicating swivel joints.

In accordance with the present invention, the typical unheated swivel assemblies are convertible into heated assemblies without necessitating their removal from the conduit system in which they are connected. To illustrate this novel method, the swivel assembly 12 (FIG. 3) will be used as an example. Since the major portion of the swivel assembly 12 is composed of the two elbow conduit sections 27 and 28, these are heated by means of jackets 50 and 51, respectively, arranged to conduct steam or other high temperature fluid around the flow conduit. As seen in the exploded view of FIGURE 2, the jacket 51 comprises a pair of preformed, mating, arcuate half shell segments 51a and 51b which are welded together in place around the elbow 28 to form a 90° elbow having inner and outer seams. The half shell segments 51a and 51b (FIG. 2) are welded together along outer seam 52 and inner seam 53 (FIG. 4) to form the jacket 51, and the annular end surfaces of the jacket 51 are then welded to the flanged pipe connector 21 and to the exterior housing member 29 of the swivel joint 20 to form a closed chamber surrounding the elbow 28. In a similar fashion the jacket 50 is assembled from a pair of like half shells and welded at its ends to the inner swivel member 30 and the flanged pipe connector 19.

Prior to the assembly of each jacket, a plurality of interiorly threaded tubular couplings are welded to the segments so as to provide communication between the exterior and the interior of the jackets. In the case of the jacket 51, for example, segment 51b (FIG. 2) has a pair of couplings 55a, let into and welded to its outer longitudinal edge, one adjacent each end of the segment 51b. The segment 51a is cut away along its corresponding edge to receive the couplings 55a when the segments are joined.

In addition, a pair of capped tubular couplings 55b are provided for a purpose presently to be described. One of the couplings 55b is in the half shell segment 51a (FIGS. 1 and 2), adjacent one end of the jacket 51, while the other of the two couplings 55b (FIG. 4) is in the other half shell segment 51b adjacent the other end of the jacket 51. Thus, the couplings 55b are disposed on opposite sides of the formed jacket 51, being offset 90° in opposite directions from the outer seam 52 wherein the couplings 55a are located.

The jacket 50 is assembled in the same manner as the jacket 51 and is similarly provided with two couplings 56a which are positioned in the outer seam (not shown) thereof, and two additional couplings 56b (one shown, FIG. 1) which are offset 90° in opposite direction from that seam.

The next step in the conversion of the swivel assembly 12 is the interconnection of the jackets 50 and 51 and their connection with the steam carrying pipe 40 in the straight conduit section 13. For this purpose, the end of the nipple 41 which projects exteriorly of the conduit 13 is threaded into one end of a tubular coupling 60. The other end of the coupling 60 receives one end of a U-shaped assembly 61 of pipe fittings, including a union 61a. The other end of the assembly 61 is threaded into the coupling 56a on the lower portion of the jacket 50, this being one of the two couplings 56a in the outer welded seam of the jacket 50. A flexible hose line 62 having threaded connectors at its ends is connected to the other coupling 56a, (this one being on the upper portion of the jacket 50) and to the coupling 55a on the lower portion of the jacket 51. A second flexible hose line 63 is threaded into the coupling 55a at the upper portion of the jacket 51. The hose 63 is led over the straight swivel joint 22 and threaded into a coupling 65 which also receives a pipe nipple 66 leading into the interior of the conduit section 15 as seen in FIGURE 3, the coupling 65 and nipple 66 being similar to the aforementioned coupling 60 ad nipple 41 in both design and function. The nipple 66 carries a T fitting 67 which supports the steam carrying pipe 68 in a manner similar to that described in connection with the steam carrying pipe line 40 of the conduit section 13. Both of the flexible hose lines 62 and 63 are made long enough so that the swivel joints which they bridge are freely rotatable through a full 360 degrees.

It may sometimes be desirable to heat the flow passage between the jacket 50 and the pipe line 40 and the flow passage between the jacket 51 and the pipe line 68. For this purpose the T fittings 42 and 67 are provided with closed tubular sections 70 and 71, respectively, which provide extensions for the steam carrying pipes 40 and 68, respectively, to heat the flow passages between the elbowed swivel joints and the straight conduit sections. If this is considered to be unnecessary, the sections 70 and 71 need not be employed, and in that event, blind plugs (not shown) should be threaded into the T fittings 42 and 67 in substitution for the extensions 70 and 71.

It can thus readily be seen that a completely closed heat conducting system is provided between the heat supplying pipe line 68 of the conduit section 15 and the heat supplying pipe line 40 of the conduit section 13. Therefore, heat supplying fluid such as steam can be circulated through the system in either direction to provide easily regulable temperature control for the material flowing within the conduit sections. The temperature of the fluent within the heat conducting system is regulated in accordance with the desired temperature to be maintained for the fluent within the conduit sections.

Although not shown in detail, the swivel assembly 11 at the other end of the intermediate conduit section 13 is provided with heat supplying means similar to that of the assembly 12.

It should be noted that the flexible hose lines are connected to the jackets 50 and 51 so that steam is circulated between the uppermost and the lowermost part of the jacket structure if the assembly is oriented as in FIGURE 3. This arrangement is for drainage purposes to prevent excessive accumulation of condensate within the jackets. Of course, the uppermost and lowermost points of each of the jackets may change when the attitude of the swivel assembly 12 is changed, but it is assumed that the attitude of the assembly of FIGURE 3 is the one in which the assembly will generally operate for the particular hose connections shown. The capped couplings 55b and 56b are provided for those occasions when the swivel assembly 12 is rotated one quarter turn about the axis of swivel joint 22 and when material is to flow through the apparatus for an extended period of time while the assembly 12 occupies the new position. The flexible hoses 63 and 62 should be removed from couplings 55a to which they are shown to be connected in FIGURES 1 and 3 and threaded into the couplings 55b which then occupy the uppermost and lowermost positions, respectively. Similarly, the hose 62 and the fitting assembly 61 should be disconnected from the couplings 56a and connected to the uppermost and lowermost couplings 56b, respectively. This may require substitution of a slightly longer fitting assembly for the assembly 61, because of the greater distance between the coupling 60 and the proximal coupling 56b. The couplings 55a and 56a, of course should be capped or plugged after the hoses 62 and 63 and the fitting assembly are removed therefrom.

Whereas the jackets 50 and 51 are shown in the drawings as being provided with but one alternative coupling 55b at each end thereof, it should be appreciated that two or more such alternative couplings may be provided at each end of each jacket, thus to facilitate connecting the hoses 62 and 63 and fitting assembly 61 to the highest and lowest portions of the jackets and thereby to minimize or prevent excessive condensate accumulation, regardless of the position to which the apparatus may be oriented. Furthermore, the hoses 62 and 63 and the fitting assembly 61 may be disconnected periodically to drain any condensate which may have formed during the heating operation.

From the foregoing description it is apparent that the present invention presents a method for the rapid and efficient conversion of a standard swivel assembly to a steam heated assembly capable of conducting heated materials without the appreciable loss of heat in any portion of the assembly. Through the use of inexpensive flexible hose line connectors, easily assembled jacket structures, and standard couplings and fittings, a heat conducting system is provided for swivel assemblies of varying length and complexity. These may be utilized with standard heated conduit sections in structures such as flexible fluid cargo handling apparatus.

While one embodiment of the present invention has been shown and described, it will be understood that various changes and modifications can be made therein without departing from the spirit of the invention or the scope of the appended claims.

The invention having thus been described what is believed to be new and desired to be protected by Letters Patent is:

1. A swivel pipe assembly comprising a pair of interconnected relatively rotatable swivel pipe members, an elbowed pipe section joined at one end to each of said members, a flanged pipe member joined to the other end of each of said elbowed pipe sections, a pair of arcuate jackets welded at their annular ends to said swivel pipe members and to said flanged pipe members to form closed chambers around said elbowed pipe sections, a pair of threaded fittings circumferentially spaced one quarter turn about said jacket at each end of each of said jackets for providing communication to said chambers, plugging means on one of each pair of said fittings, a flexible hose connected to the others of said fittings at both sides of said swivel pipe members and providing communication between said chambers, said hose being of such a length that said swivel pipe members may be relatively rotated through a full 360 degrees, and fluid conducting lines connected to the others of said fittings at the ends of said jackets adjacent said flanged pipe members, said lines and said chambers and said hose forming a continuous passage through said swivel assembly for the conductance of a heat supplying fluid to heat material flowing within said pipe sections.

2. A swivel pipe assembly comprising a pair of interconnected relatively rotatable swivel pipe members, an elbowed pipe section joined at one end to each of said members, a conduit joined to the other end of each of said elbowed pipe sections, said conduits including straight pipe sections, a pair of arcuate jackets welded at their ends to said swivel pipe members and to said conduits to form closed chambers around the elbowed pipe sections, fluid conducting pipes of substantially smaller diameter than said straight pipe sections axially positioned within said straight pipe sections, means directing fluid from said fluid conducting pipes to said closed chambers, and a flexible hose connected to said jackets and providing communication between said chambers so that a heat supplying fluid may be passed through said fluid conducting pipes and said chambers and said hose to heat material flowing within said assembly, said hose being of such a length that said swivel pipe members may be relatively rotated through a wide angle.

(References on following page)

References Cited by the Examiner

UNITED STATES PATENTS

| | | | |
|---|---|---|---|
| 1,247,937 | 11/17 | Cumfer | 137—375 |
| 1,288,631 | 12/18 | McFarland | 285—134 |
| 1,485,252 | 2/24 | Denis | 285—181 |
| 1,495,066 | 5/24 | Browne | 285—134 |
| 1,527,273 | 2/25 | Riehm | 137—340 X |
| 1,678,744 | 7/28 | Olsen | 29—463 |
| 2,658,527 | 11/53 | Kaiser | 137—310 |
| 2,683,592 | 7/54 | Birney | 285—41 |
| 2,746,773 | 5/56 | Bily | 285—90 |
| 2,927,607 | 3/60 | Bily | 137—615 |
| 3,105,708 | 10/63 | Esty | 285—41 |

CARL W. TOMLIN, *Primary Examiner.*